US009481249B2

(12) United States Patent
Yamazaki

(10) Patent No.: US 9,481,249 B2
(45) Date of Patent: Nov. 1, 2016

(54) ELECTRIC VEHICLE

(71) Applicant: Honda Motor Co., Ltd., Tokyo (JP)

(72) Inventor: Takayuki Yamazaki, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 431 days.

(21) Appl. No.: 14/348,685

(22) PCT Filed: Oct. 19, 2012

(86) PCT No.: PCT/JP2012/077094
§ 371 (c)(1),
(2) Date: Mar. 31, 2014

(87) PCT Pub. No.: WO2013/061880
PCT Pub. Date: May 2, 2013

(65) Prior Publication Data
US 2014/0319907 A1 Oct. 30, 2014

(30) Foreign Application Priority Data

Oct. 26, 2011 (JP) ................................ 2011-235070

(51) Int. Cl.
*B60K 1/04* (2006.01)
*B60L 1/00* (2006.01)
(Continued)

(52) U.S. Cl.
CPC .................. *B60L 1/006* (2013.01); *B60K 1/04* (2013.01); *B60L 11/1818* (2013.01); *B60L 11/1877* (2013.01); *B62K 11/10* (2013.01); *H01M 2/1083* (2013.01); *H01M 10/46* (2013.01);
(Continued)

(58) Field of Classification Search
CPC ............ B60K 1/04; B60K 2001/0422; B60K 2001/0433; B60K 2001/0455; B60K 2001/0466; B60L 1/006; B60L 11/18; B60L 11/1805; B60L 11/1809; B60L 11/1811; B60L 11/1812; B60L 11/1816; B60L 11/1818; B60L 11/1877; B60L 2200/12; B60Y 2200/12; B62K 2204/00; B62K 2208/00; H01M 2/1016; H01M 2/1022; H01M 2/1072; H01M 2/1083; H01M 2220/20; H02J 7/022; Y02T 10/7005; Y02T 10/7072; Y02T 90/10; Y02T 90/14
USPC ........................................................ 307/9.1
See application file for complete search history.

(56) References Cited

U.S. PATENT DOCUMENTS

2004/0031632 A1* 2/2004 Kohda ..................... B60K 1/04
180/68.5
2008/0199771 A1* 8/2008 Chiu ................... H01M 2/1083
429/186

(Continued)

FOREIGN PATENT DOCUMENTS

JP 5-85362 A 4/1993
JP 11-129960 A 5/1999
(Continued)

*Primary Examiner* — Levi Gannon
(74) *Attorney, Agent, or Firm* — Birch, Stewart, Kolasch & Birch, LLP

(57) ABSTRACT

An electric vehicle equipped with an automotive battery. The automotive battery has a charging unit on the left side surface, discharging units on the right side surface, and a battery-side power supply terminal on the lower surface. The automotive battery drives an electric motor when the vehicle is moving, supplies power to external electrical products when the vehicle is not moving, and is configured so as to be usable at all times.

8 Claims, 10 Drawing Sheets

(51) Int. Cl.
   *B60L 11/18* (2006.01)
   *H01M 2/10* (2006.01)
   *H01M 10/46* (2006.01)
   *B62K 11/10* (2006.01)
   *H02J 7/02* (2016.01)
   *B60K 7/00* (2006.01)

(52) U.S. Cl.
   CPC ............ *H02J 7/022* (2013.01); *B60K 7/0007* (2013.01); *B60K 2001/0422* (2013.01); *B60K 2001/0455* (2013.01); *B60K 2001/0466* (2013.01); *B60K 2007/0038* (2013.01); *B60K 2007/0092* (2013.01); *B60L 2200/12* (2013.01); *B60Y 2200/12* (2013.01); *B62K 2204/00* (2013.01); *B62K 2208/00* (2013.01); *H01M 2220/20* (2013.01); *Y02T 10/7005* (2013.01); *Y02T 10/7072* (2013.01); *Y02T 90/14* (2013.01)

(56) References Cited

U.S. PATENT DOCUMENTS

| | | | |
|---|---|---|---|
| 2009/0315359 A1* | 12/2009 | Suzuki | B60K 1/04 296/64 |
| 2012/0176086 A1 | 7/2012 | Nakamura et al. | |
| 2013/0057074 A1* | 3/2013 | Takano | H01M 2/1072 307/66 |

FOREIGN PATENT DOCUMENTS

| | | |
|---|---|---|
| JP | 2000-33893 A | 2/2000 |
| JP | 2007-209188 A | 8/2007 |
| JP | 2009-40087 A | 2/2009 |
| JP | 2011-136626 A | 7/2011 |
| WO | WO 2011/024326 A1 | 3/2011 |

* cited by examiner

ELECTRIC VEHICLE

TECHNICAL FIELD

The present invention relates to an improvement in an electric vehicle driven to travel by an electric power of an on-board battery.

BACKGROUND ART

In electric vehicles, on-board batteries and fuel cells are put in practical use as energy source. Since the fuel cells are expensive, the on-board batteries are largely used as the energy source of the electric vehicles.

A variety of kinds of on-board batteries mounted on electric vehicles have been proposed (see patent literature 1 (FIGS. 1, 2 and 11)).

As disclosed in JP-B-3683307, a power assisted bicycle includes a battery housing device disposed along a rear surface of a seat tube supporting a seat. The battery housing device has an outer box providing a visual appearance of the device.

As disclosed in JP-B-3683307, an inner box incorporating a battery therein is releasably housed in the outer box. A connection mechanism mates with female terminals to electrically connect the battery to a vehicle-body-side such that electric energy generated by an on-board electric generator is supplied through the connection mechanism to the battery to supply vehicle-body-side parts (an electric motor and on-board electrical components etc.) with an electric power stored in the battery.

An external plug can be inserted into a charge opening of the battery housing device, as needed, to allow an external power supply to charge the battery.

As is clear from the foregoing, the on-board battery is mounted on the vehicle body for the purpose of supplying an electric power to vehicle-body-side parts (an electric motor and electrical components). Apart from supply of a bit of electrical power to the electrical components, however, the on-board battery is not effectively used as the electric vehicle does not travel.

The on-board battery, which is a high-quality electrical storage device, is expected to be utilized as the electric vehicle does not travel.

SUMMARY OF INVENTION

Technical Problem

It is an object of the present invention is to provide an electric vehicle including an on-board battery having an extended utility.

Solution to Problem

According to one aspect of the present invention, there is provided an electric vehicle including a vehicle body, an on-board battery mounted on the vehicle body, and an electric motor supplied with an electric power from the on-board battery, the electric vehicle being driven by the electric motor to travel, wherein the vehicle body includes a battery receiving portion for releasably receiving the on-board battery, the battery receiving portion having vehicle-body-side feeding terminals disposed on a bottom thereof for supplying an electric power of the on-board battery to a vehicle body side, wherein the on-board battery has battery-side feeding terminals disposed on a bottom surface thereof for mating with the vehicle-body-side feeding terminals of the battery receiving portion, wherein the on-board battery has a charge portion disposed on one lateral surface thereof for allowing an external power supply to charge the on-board battery, the one lateral surface facing one of left and right sides of the vehicle body, wherein the on-board battery has a discharge portion disposed on an opposite lateral surface for supplying an electric power of the on-board battery to an outside, the opposite lateral surface facing the other of the left and right sides of the vehicle body, and wherein the on-board battery has a transformer incorporated therein for transforming an electric power and/or converting a DC to an AC, and wherein the vehicle body includes lateral surfaces having a charge side opening for allowing a plug or a connector to pass through the charge side opening into connection to the charge portion, and a discharge side opening for allowing a plug or a connector to pass through the discharge side opening into connection to the discharge portion.

The on-board battery has a raised or recessed portion formed on a surface thereof, and the battery receiving portion has a recessed or raised guide for guiding the raised or recessed portion of the on-board battery.

The battery receiving portion is provided with a locking mechanism for preventing the on-board battery received in the battery receiving portion from coming out of the battery receiving portion.

The vehicle-body-side feeding terminals protrude upwardly from the bottom of the battery receiving portion.

The charge side opening and the discharge side opening are closed by lids each movable between an open position and a closed position.

The vehicle body further includes a receptacle disposed behind the battery receiving portion and the receptacle receives an operational lever of the locking mechanism.

The bottom of the battery receiving portion has a drainage port formed therethrough.

The on-board battery has the transformer incorporated therein for transforming the electric power and/or converting the DC to the AC. On the one lateral surface of the on-board battery facing the one of the right and left sides of the vehicle body, the charge portion is disposed for allowing the external power supply to charge the on-board battery. On the opposite lateral surface of the on-board battery, the discharge portion is disposed for supplying an electric power of the on-board battery to the outside.

The discharge portion can be connected to a plug or connector of an electrical product to make the product available as the electric vehicle does not travel.

As the electric vehicle does not travel, further, the charge portion can be supplied with an electric power from the external power supply, and the electric power is transformed by the transformer and supplied through the discharge portion to the electric product. That is, the discharge can be done during the charge.

Namely, the on-board battery drives the electric motor as the vehicle travels, and supplies the electric power to the electric product as the vehicle does not travel. The on-board battery is always available.

According to the present invention, there is provided the electric vehicle including the on-board battery having the extended utility.

The on-board battery has the raised or recessed portion formed on the surface thereof, and the battery receiving portion has the recessed or raised guide. The raised (or recessed) portion of the on-board battery can be guided by the recessed (or raised) guide of the battery receiving portion such that the on-board battery can be smoothly released from and inserted into the battery receiving portion without shaking. As a result, the on-board battery can be more accurately positioned in the battery receiving portion to allow the battery-side feeding terminals to smoothly mate with the vehicle-body-side feeding terminals.

The battery receiving portion is provided with the locking mechanism for preventing the received on-board battery from coming out of the battery receiving portion. The locking mechanism locks the on-board battery in the battery receiving portion, such that the on-board battery is not likely to be displaced upwardly out of the battery receiving portion even when the vehicle shakes up and down on a bumpy road. That is, the on-board battery can be surely fixed by the locking mechanism.

The vehicle-body-side feeding terminals protrude upwardly from the bottom of the battery receiving portion. Water may intrude into the battery receiving portion through a chink in the battery. Even if water is collected on the bottom of the battery receiving portion, the vehicle-body-side feeding terminals, which are located above the bottom of the battery receiving portion, are not submerged in the collected water.

The on-board battery has a recess formed on the bottom surface thereof to conform to the upward protrusion of the vehicle-body-side feeding terminals, and the battery-side feeding terminals are disposed in this recess. The recess can receive and guide the vehicle-body-side feeding terminals to more accurately position the on-board battery and hence facilitate mounting of the on-board battery.

The charge side opening and the discharge side opening are closed by the lids movable between the opened position and the closed position. The charge side opening and the discharge side opening may be subjected to intrusion of rainwater or dust if these openings were kept open or exposed. Thus, in the present invention, the lids are provided for preventing the intrusion of the rainwater or dust into the openings.

The vehicle body further includes the receptacle disposed behind the battery receiving portion, and the receptacle receives the operational lever of the locking mechanism.

The receptacle defines a space available to allow an operator to put his hand into the space for manipulating the operational lever. The manipulation of the operational lever easily controls the locking mechanism.

The bottom of the battery receiving portion has the drainage port formed therethrough.

The drainage port can discharge water as soon as the water intrudes into the battery receiving portion. As a result, it is becomes possible to prevent the battery from being deteriorated by the submersion of the battery in the water.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF DRAWINGS

The present invention will become more fully understood from the detailed description given hereinbelow and the accompanying drawings which are given by way of illustration only, and thus are not limitative of the present invention, and wherein.

DESCRIPTION OF EMBODIMENT

A certain preferred embodiment of the present invention is described below with reference to the accompanying drawings.

Embodiment

Figure 1:
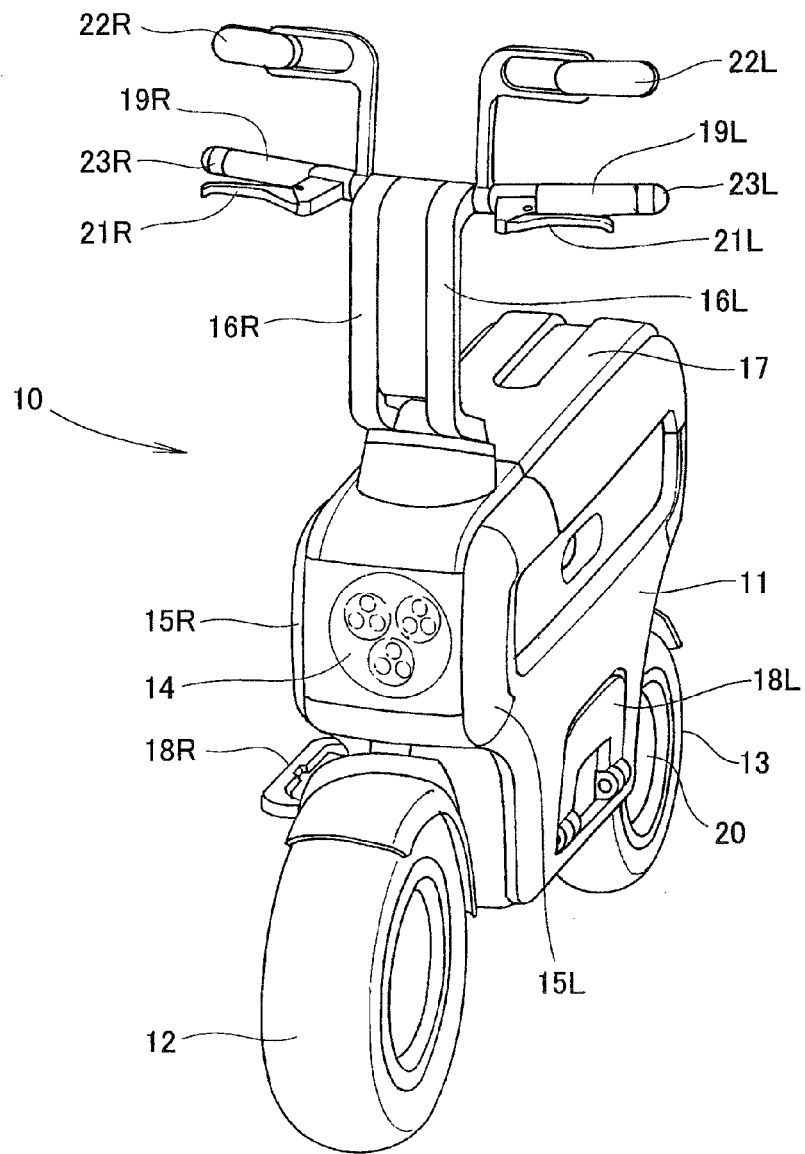
FIG. 1 is a perspective view of an electric vehicle according to the present invention.

As shown in FIG. 1, an electric vehicle 10 includes a box-shaped vehicle body 11 having front and rear wheels 12, 13. A headlight 14, a left front blinker 15L and a right front blinker 15R are disposed on a front surface of the vehicle body 11. The vehicle body 11 includes handle posts 16L, 16R at a front portion of a top surface thereof. The vehicle 11 includes a sear 17 disposed on a rear portion of the top surface thereof. The vehicle body 11 further includes pivotable steps 18L, 18R at opposite lateral sides thereof. The electric vehicle 10 is an electric motorcycle adapted to be driven by an electric motor 20 incorporated in the rear wheel 13.

For the sake of convenience, the left step 18L is shown as being upright (a non-used and stowed position) and the right step 18R is shown as lying (a used position).

A rider sits on the seat 17 with his feet on the steps 18L, 18R, gripping both a handle grip 19L on a top of the left handle post 16L and a right handle grip 19R on a top of the right handle post 16R. Then, he rides on the electric vehicle 10 by turning the right handle grip 19R. During his riding, he can apply a brake to the electric vehicle 10 by left and right brake levers 21L, 21R, and look behind by left and right rearview mirrors 22L, 22R. Position lamps are provided at lateral outer ends of the handle grips 19L, 19R to indicate a width of the vehicle to the surroundings.

Figure 2:
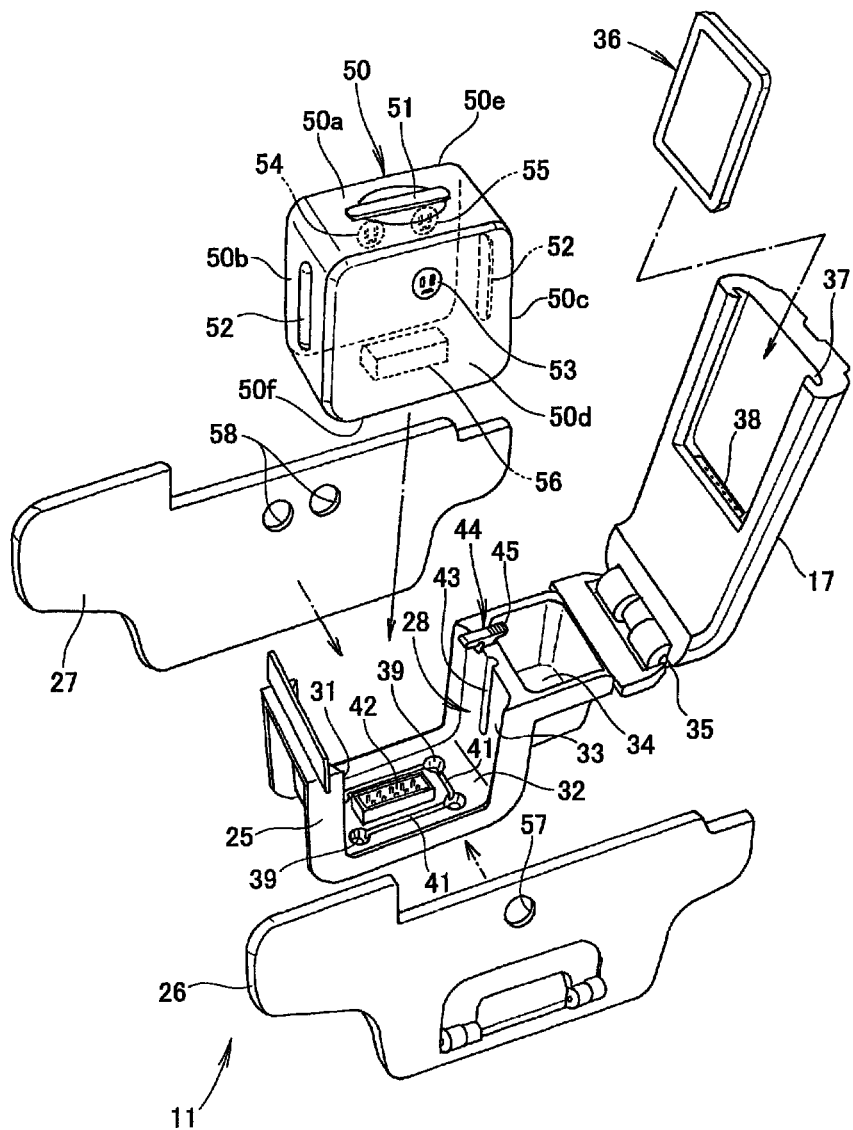
FIG. 2 is an exploded perspective view of the relevant part of the electric vehicle.

FIG. 2 is an exploded perspective view of the relevant part of the vehicle body 11. The vehicle body 11 primarily includes a central frame 25 disposed laterally centrally thereof, a left side frame 26 disposed along a left side surface of the central frame 25, and a right side frame 27 disposed along a right side surface of the central frame 25.

The central frame 25 includes a front wall 31, a bottom 32, a rear wall 33, and a receptacle 34 disposed behind and contiguous with the rear wall 33. The front wall 31, the bottom 32 and the rear wall 33 define a battery receiving portion 28. The seat 17 is attached through a hinge 35 to a rear portion of the receptacle 34 in such a manner as to move between an open position and a closed position.

The seat 17 has a pocket portion 37 formed on a bottom (lower surface) thereof to releasably receive a tablet terminal 36. The pocket portion 37 has a terminal part 38 at one end thereof for electrical connection of the tablet terminal 36 to a vehicle body side. The tablet terminal 36 serves as an on-board computer while the electric vehicle 10 travels, as is discussed in detail later.

While the electric vehicle 10 does not travel, the seat 17 can move to the open position, as shown in FIG. 2, to set the tablet terminal 36 uprightly to display an enjoyable video or game like a television set, as well as to act as a personal computer providing an information tool via an internet.

The battery receiving portion 28 has a plurality of foot-receiving recesses 39 formed on the bottom 32. These recesses 39 are connected to one another via communication grooves 41. The recesses 39 surround an area where vehicle-body-side feeding terminals 42 are to be positioned.

The rear wall 33 has a vertically elongated recessed guide 43 formed thereon. Although not shown, a recessed guide is formed on the front wall 31.

A locking mechanism 44 is mounted on the rear wall 33. As is discussed in detail later, the locking mechanism 44 has an operational lever 45 extending into the receptacle 34. The operational lever 45 is preferably located closer to a right or left end of the receptacle 34, such that the operational lever 45 does not get in the way of putting small goods into or out of the receptacle 34.

An on-board battery 50 is a relatively simple hexahedron having a top surface 50a with a handle 51, front and rear surfaces 50b, 50c having vertically elongated raised portion 52, 52, a left side surface 50d having a charge portion 53, a right side surface 50e having discharge portions 54, 55, and a bottom surface 50f having battery-side feeding terminals 56.

The on-board battery 50 can be lowered with the raised portions 52, 52 fitting in the recessed guides of the front and rear walls 31, 33, such that the on-board battery 50 can be smoothly received in the battery receiving portion 28. Since the raised portions 52, 52 fit in the recessed guides during the lowering of the on-board battery 50, the battery-side feeding terminals 56 can come into mating engagement with the vehicle-body-side feeding terminals 42 without shaking. In addition, the raised portions 52, 52 fit in the recessed guides to allow the on-board battery 50 to be released upwardly out of the battery receiving portion 28 without shaking.

It is noted that the raised portions 52, 52 may be changed into recessed portions, in which case the recessed guides are changed into raised guides.

The left side frame 26 has a charge side opening 57 at a location corresponding to the charge portion 53 of the on-board battery 50.

The right side frame 27 has discharge side openings 58, 58 at locations corresponding to the discharge portions 54, 55 of the on-board battery 50.

Figure 3:
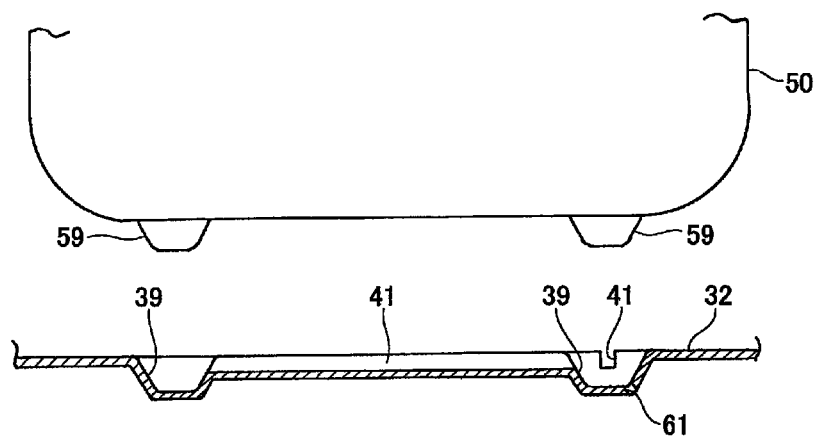
FIG. 3 is a cross-sectional view of a bottom of a battery receiving portion of the electric vehicle.

As shown in FIG. 3, the on-board battery 50 has a plurality of feet 59 protruding from the bottom surface 50f to allow for positioning only the on-board battery 50 on a floor or road.

The foot-receiving recesses 39 on the bottom 32 are configured to receive those feet 59. The recesses 39 are connected to one another through the communication grooves 41. One of the four recesses 39 has a drainage port 61 formed therethrough.

Water collected in the other foot-receiving recesses 39 passes through the communication grooves 41 into the one foot-receiving recess 39 and discharged through the drainage port 61 out of the vehicle body.

Although all the foot-receiving recesses 39 have the drainage ports 61, it results in a high risk that a portion of water in a puddle passes through the drainage ports into the battery receiving portion 28 as the electric vehicle 10 runs through the puddle.

Thus, in this embodiment, the one of the four foot-receiving recesses 39 has the drainage port 61 to reduce likelihood of flow of water back into the battery receiving portion 28.

Figure 4:
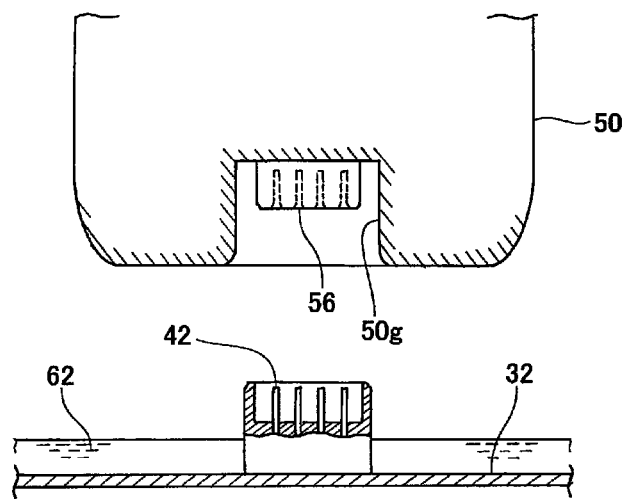
FIG. 4 is a cross-sectional view of vehicle-body-side feeding terminals.

Normally, water on an upper surface of the bottom 32 is forced to quickly drain off. However, the drainage of water may be insufficient where more water intrudes into the battery receiving portion 28 than out of the battery receiving portion 28 or where the drainage port 61 clogs. As measures against this possible insufficient drainage of water, the vehicle-body-side feeding terminals 42 protrude upwardly from the bottom 32, as shown in FIG. 4. Taking such measures makes the vehicle-body-side feeding terminals 42 unlikely to be submerged in a little water 62 collected on the bottom 32.

The on-board battery 50 has a recess 50g corresponding to the vehicle-body-side feeding terminals 42, and the battery-side feeding terminals 56 are disposed in the recess 50g. The recess 50g has a depth set to conform to the upward protrusion of the vehicle-body-side feeding terminals 42, such that the recess 50g acts as a guide to accurately position the battery-side feeding terminals 56 relative to the vehicle-body-side feeding terminals 56 so as to bring the battery-side-feeding terminals 56 into mating engagement with the vehicle-body-side feeding terminals 42.

A discussion is made below as to the details of the locking mechanism 44.

Figure 5:
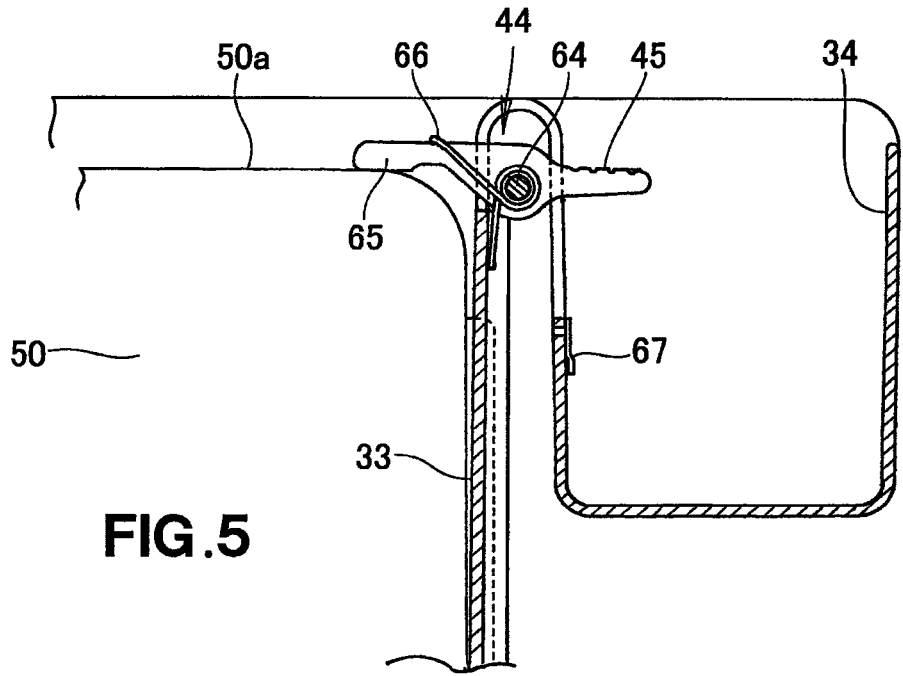
FIG. 5 is a cross-sectional view of a locking mechanism on an on-board battery of the electric vehicle.

As shown in FIG. 5, the locking mechanism 44 includes a stopper projection 65 pivotably attached to an upper portion of the rear wall 33 through a pin 64. The operational lever 45 of the locking mechanism 44 extends from the stopper projection 65 and provides a tab portion for engagement with an operator's finger. The locking mechanism 44 further includes a torsion spring 66 urging the stopper projection 65 against the top surface of the on-board battery 50.

Preferably, the operational lever 45 extends into the receptacle 34. A temporary stopper 67 is rotatably disposed on the receptacle 34 for temporarily retaining the operational lever 45.

Figure 6:
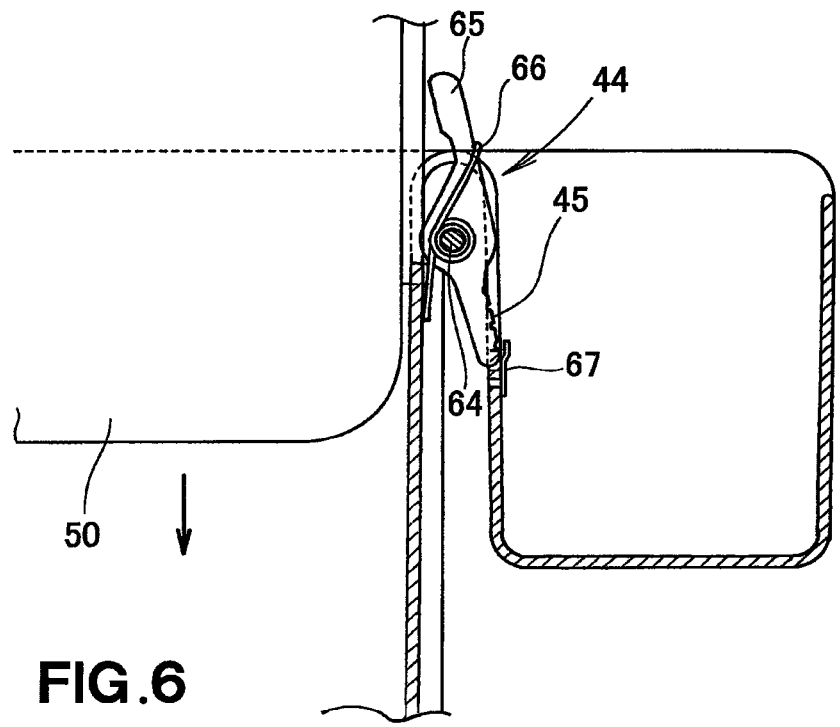
FIG. 6 is a view showing a function of the locking mechanism.

As shown in FIG. 6, to insert the on-board battery 50 into the battery receiving portion 28 or vice versa, the operational lever 45 is depressed to cause the stopper projection 65 to pivot away from the on-board battery 50, after which the depressed operational lever 45 is retained by the temporary stopper 67. The on-board battery 50 can be inserted into the battery receiving portion 28 with the depressed operational lever 45 retained by the temporary stopper 67. Subsequently to the insertion of the on-board battery 50, the temporary stopper 67 is rotated to free the operational lever 45, such that the stopper projection 65 is forced to pivot back onto the top surface 50a of the on-board battery 50, as shown in FIG. 5, so as to hold down the top surface 50a.

Turning back to FIG. 2, although the charge side opening 26 of the left side frame 26 or the discharge side opening 58 of the right side frame 27 may be kept open, some measures should be taken where there is concern that the on-board battery 50 is adversely affected by rainwater intruding through these openings.

Exemplary ones of those measures are discussed below.

Figure 7:
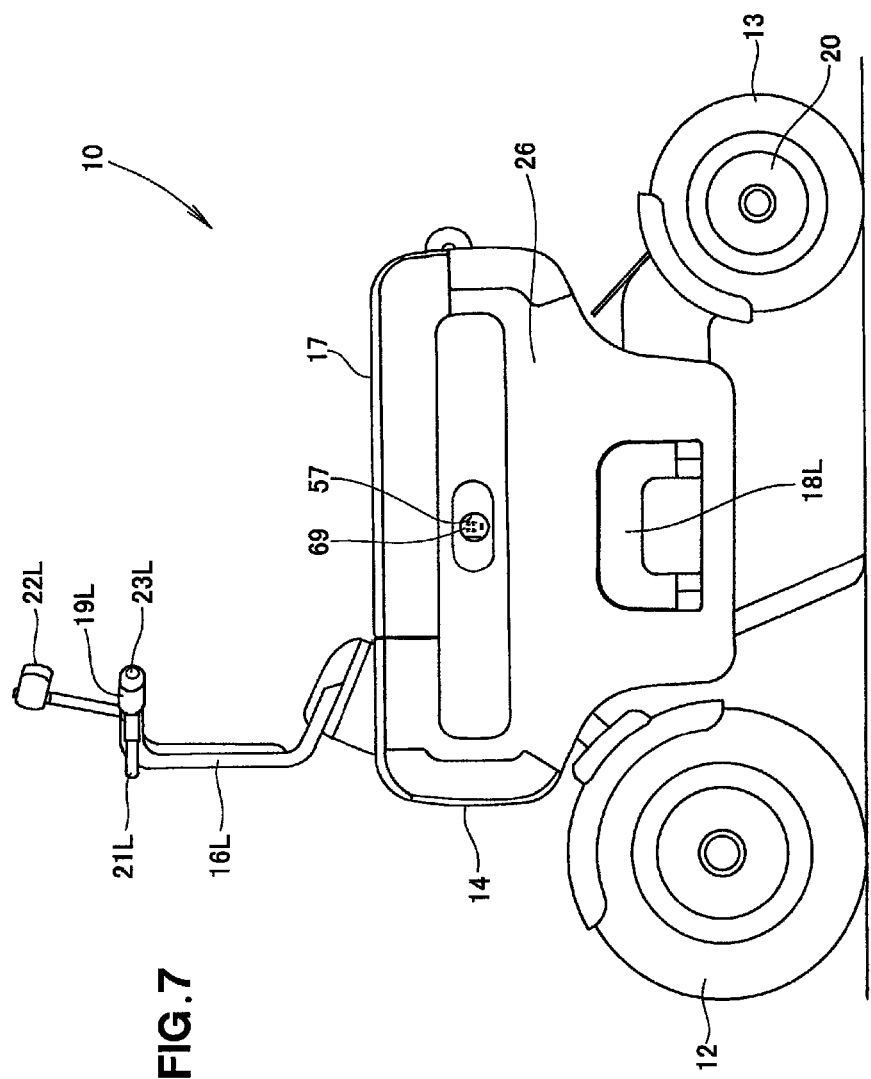
FIG. 7 is a left side elevation view of the electric vehicle.

As shown in FIG. 7, it is preferable to dispose a lid on the charge side opening 57 of the left side frame 26 in such a manner that the charge side opening 57 is opened or closed by the lid. Two examples of such a lid, i.e., a shutter and a plug are discussed below in order.

Figure 8:
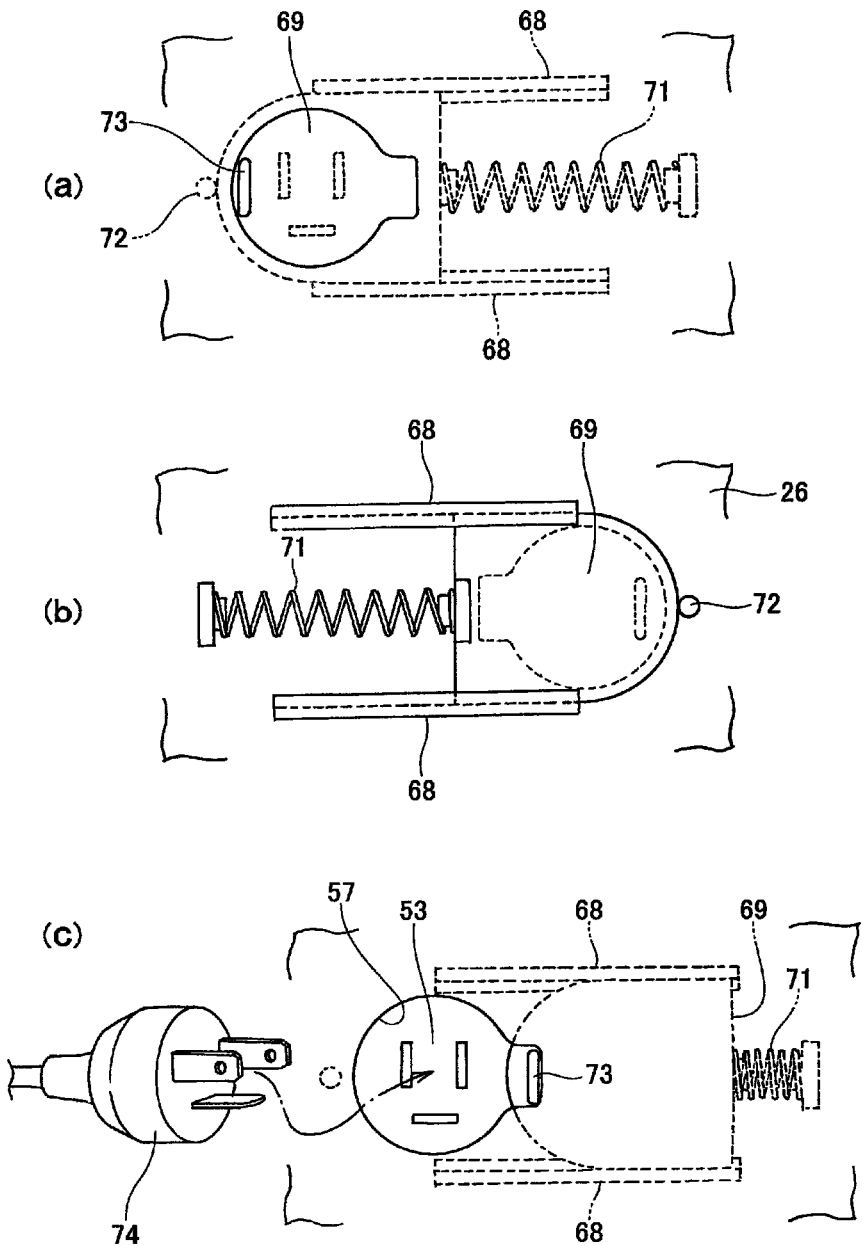
FIG. 8 is a view showing in detail a shutter providing a lid for a charge side opening of the electric vehicle.

FIG. 8(a) is an enlarged view of the relevant portion of FIG. 7. FIG. 8(b) is a rear elevation view of the relevant portion shown in FIG. 7.

As shown in FIG. 8(b), two L-shaped cross-sectional rails 68, 68 bare attached to a back surface of the left side frame 26 (i.e., a surface facing a center of the vehicle body). A shutter 69 fits between the two rails 68, 68 and is urged by a compression spring 71 to a closed position. Preferably, a stopper pin 72 for stopping the shutter 69 in the closed position is disposed in protrusion from the left side frame 26.

As shown in FIG. 8(c) illustrating a function of the shutter 69 shown in FIG. 8(a), the shutter 69 is moved to an open position with an operator's finger engaging a tab 73. As a result, the charge side opening 57 is opened to reveal the charge portion 53 behind the charge side opening 57. A feeding plug 74 (or a feeding connector) is inserted into the charge portion 53 to charge the on-board battery. When the charging of the on-board battery is finished and the feeding plug 74 is removed from the charge portion 53, the shutter 69 is forced to move back to the closed position under the action of the compression spring 71, such that the charge side opening 57 is closed by the shutter 69, as shown in FIG. 8(a).

Figure 9:
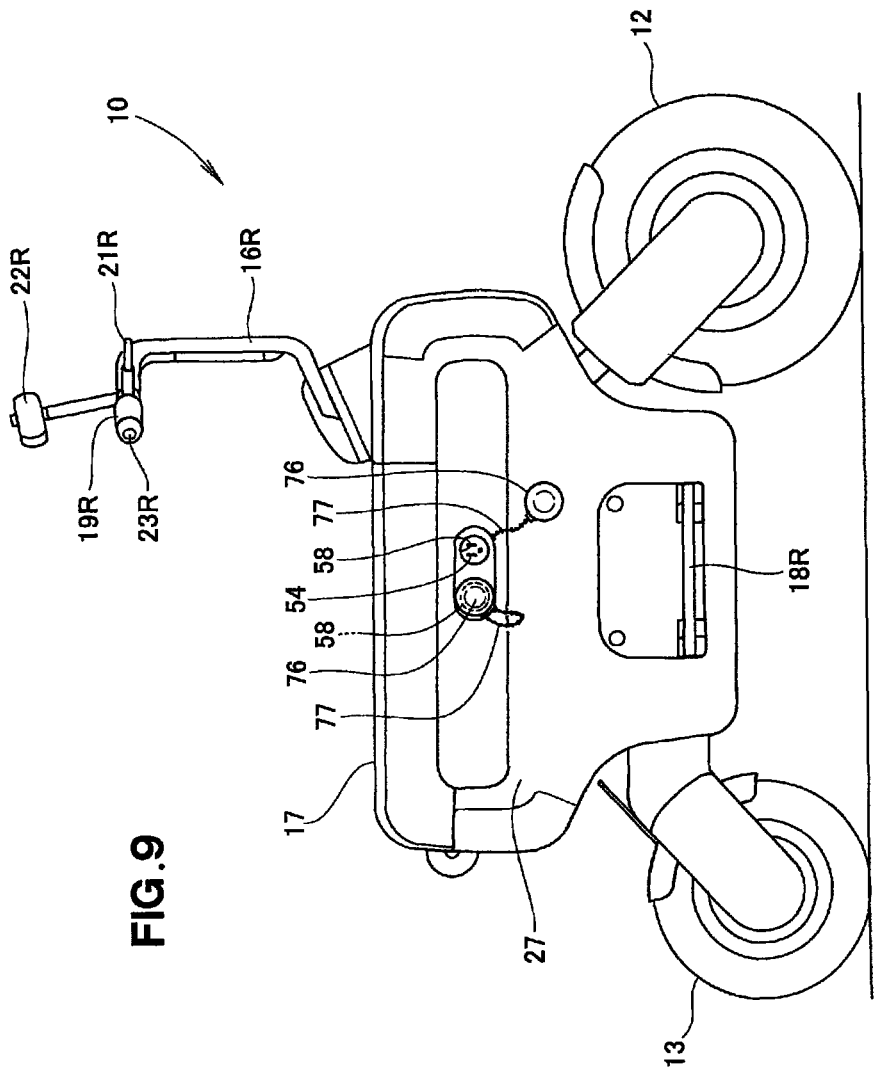
FIG. 9 is a right side elevation view of the electric vehicle.

As shown in FIG. 9, it is desirable to dispose lids on the discharge side openings 58, 58 of the right side frame 27 in such a manner that the discharge side openings 58, 58 are opened or closed by the lids.

Figure 10:
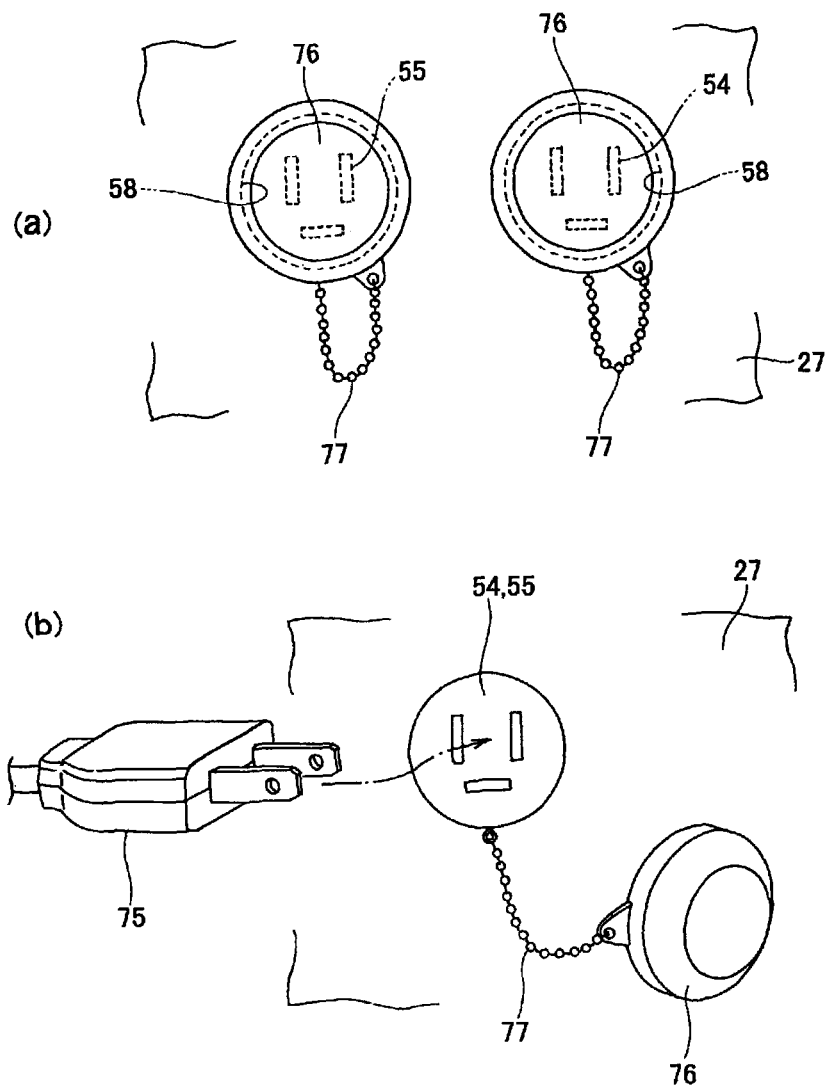
FIG. 10 is a view showing in detail plugs providing lids for discharge side openings of the electric vehicle.

As shown in FIG. 10(A), plugs 76, 76 of rubber or soft resin fit in or cover the discharge side openings 58, 58.

As shown in FIG. 10(b), removal of the plug 76 reveals the discharge portion 54 (or 55) behind the discharge side opening. A receiving plug 75 (or a receiving connector) of an electrical product is connected to the discharge portion 54. The plug 76 is desirably connected to the right side frame 27 by means of a string-like part 77 such as a chain so as to prevent loss of the plug 76.

All of the charge side opening 57 and the discharge side openings 58, 58 may be closed by the plugs 76. The plug 76 is of simple structure and cheap. It is noted that the string-like part 77 may get in the way or the plug 76 partially protrudes from the frame 27. In light of these factors, it is preferable to close all of the charge side opening 57 and the discharge side openings 58, 58 by the shutters 69.

Thus, the lid may be the plug 76, the shutter 69 or other similar closing members regardless of the kind and type.

A discussion is made below as to a function of the on-board battery.

Figure 11:
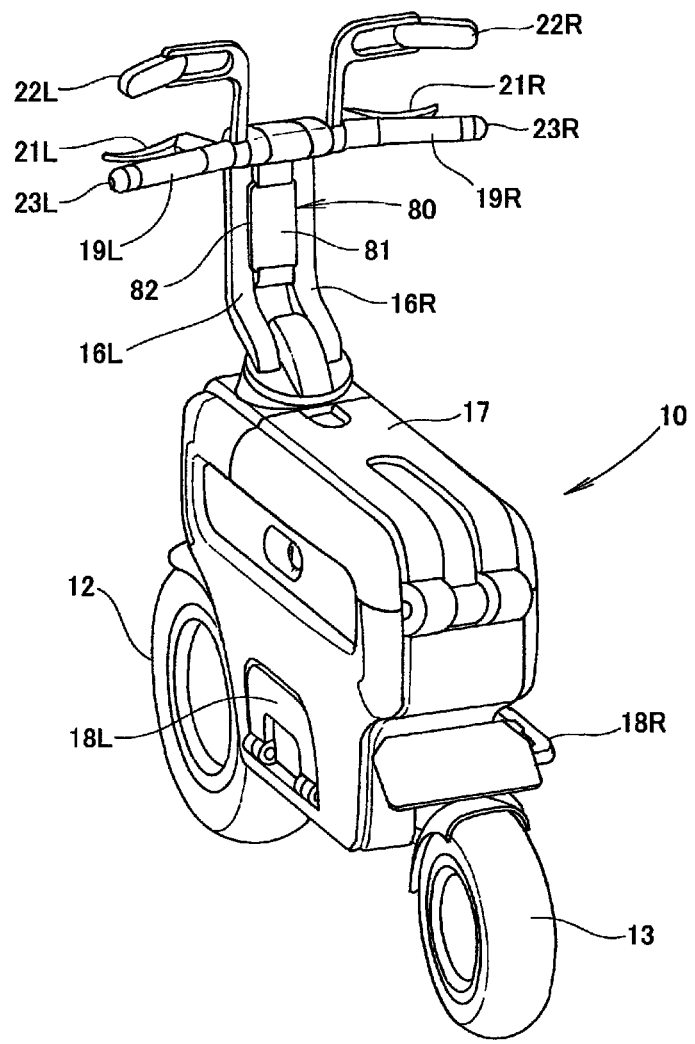
FIG. 11 is a rear perspective view of the electric vehicle.

FIG. 11 is a rear perspective view of the electric vehicle 10. The electric vehicle 10 includes a mobile terminal 80 between the left and right handle posts 16L, 16R. The mobile terminal 80 includes a display portion 81 for displaying a vehicle velocity, a directional indication, an amount of electric power stored in the battery, and other statuses. The mobile terminal 80 further includes a terminal body 82 incorporating therein an arithmetic circuit and a memory. That is, the electric vehicle 10 does not have a fixed meter unit, and the mobile terminal 80 serves as a meter unit.

Figure 12:
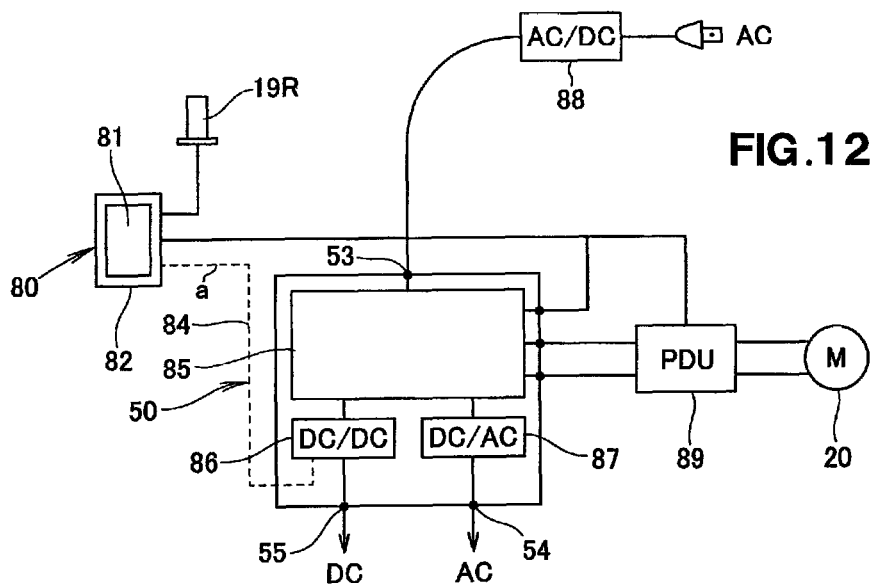
FIG. 12 is a block diagram of the on-board battery and the peripherals.

As shown in FIG. 12, the on-board battery 50 includes a battery case 84, a battery body 85 disposed in the battery case 84, and transformers 86, 87 disposed in the battery case 84. The transformer 86 is a DC/DC converter for a DC voltage to a different DC voltage. The transformer 87 is, for example, a DC/AC inverter for converting DC 12 V into AC 100 V.

As the electric vehicle does not travel, a given DC (e.g., DC 24 V) is supplied from a commercial power supply (AC 100 V, 110 V, 200 V, 220 V etc.) through a battery charger 88 to the charge portion 53 for charging the on-board battery.

As the electric vehicle travels, an electric power from the charge portion 53 through a drive circuit 89 to the electric motor 20, during which an amount of rotation of the right handle grip 19R is detected by a sensor and information on the amount of rotation of the right handle grip 19R is transmitted to the mobile terminal 80 for providing a command from the mobile terminal 80 to control the drive circuit 89 so as to adjust a vehicle velocity. It is noted that the information on the amount of rotation of the right handle grip 19R may be transmitted directly to the drive circuit 89.

The on-board battery 50 serves as a power supply in, e.g., an outdoor camp as the electric vehicle does not travel. That is, AC 100 V (or AC 110 V) can be supplied from the discharge portion 54 to a rice steamer or lighting.

Further, DC 12 V can be supplied from the discharge portion 55 to a personal computer.

The on-board battery 50 can be supplied with an electric power not only as the on-board battery 50 is mounted on the vehicle body but also as the on-board battery 50 is detached from the vehicle body, that is, the on-board battery 50 is provided solo.

A feed line "a" shown by a phantom line extends from the transformer 86 and is electrically connected to the mobile terminal 80 for supplying the mobile terminal 80 with an electric power constantly or as needed. As a result, it becomes possible to prevent reduction in electric power remaining in a battery incorporated in the mobile terminal 80.

Figure 13:
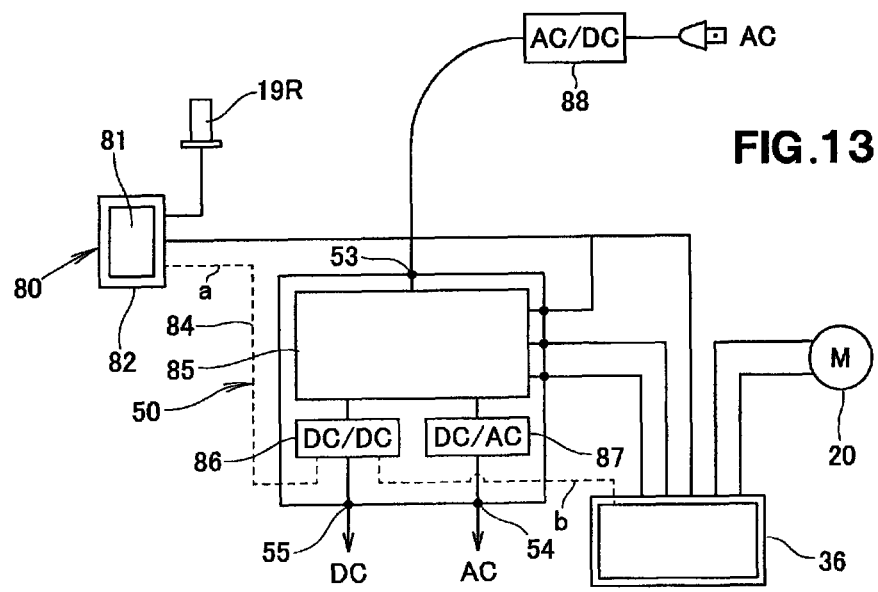
FIG. 13 is a view showing an alternative to an arrangement shown in FIG. 12.

FIG. 13 is a view showing an alternative to an arrangement shown in FIG. 12. More specifically, in FIG. 13, the tablet terminal 36 is provided in place of the drive circuit 89. FIG. 13 shows the same elements as those in FIG. 13 except for the tablet terminal 36, and hence discussions of the elements are omitted.

A feed line "b" shown by a phantom line extends from the transformer 87 and is electrically connected to the tablet terminal 36 for supplying the tablet terminal 36 with an electric power constantly or as needed. As a result, it becomes possible to prevent reduction in electric power remaining in a battery incorporated in the tablet terminal 36.

Although the present invention has been discussed as being applied to the electric motorcycle in the embodiment, the present invention is applicable to an electric three-wheeled vehicle and another well-known electric vehicle.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

The invention claimed is:

1. An electric vehicle including a vehicle body, an on-board battery mounted on the vehicle body, and an electric motor supplied with an electric power from the on-board battery, the electric vehicle being driven by the electric motor to travel, wherein the vehicle body includes a battery receiving portion for releasably receiving the on-board battery, the battery receiving portion having vehicle-body-side feeding terminals disposed on a bottom thereof for supplying an electric power of the on-board battery to a vehicle body side, wherein the on-board battery has battery-side feeding terminals disposed on a bottom surface thereof for mating with the vehicle-body-side feeding terminals of the battery receiving portion, wherein the on-board battery has a charge portion disposed on one lateral surface thereof for allowing an external power supply to charge the on-board battery, the one lateral surface facing one of left and right sides of the vehicle body, wherein the on-board battery has a discharge portion disposed on an opposite lateral surface for supplying an electric power of the on-board battery to an outside, the opposite lateral surface facing the other of the left and right sides of the vehicle body, and wherein the on-board battery has a transformer incorporated therein for transforming an electric power and/or converting a DC to an AC, and wherein the vehicle body includes lateral surfaces having a charge side opening for allowing a plug or a connector to pass through the charge side opening into connection to the charge portion, and a discharge side opening for allowing a plug or a connector to pass through the discharge side opening into connection to the discharge portion.

2. The vehicle of claim 1, wherein the on-board battery has a raised or recessed portion formed on a surface thereof, and the battery receiving portion has a recessed or raised guide for guiding the raised or recessed portion of the on-board battery.

3. The vehicle of claim 1, wherein the battery receiving portion is provided with a locking mechanism for preventing the on-board battery received in the battery receiving portion from coming out of the battery receiving portion.

4. The vehicle of claim 1, wherein the vehicle-body-side feeding terminals protrude upwardly from the bottom of the battery receiving portion.

5. The vehicle of claim 1, wherein the charge side opening and the discharge side opening are closed by lids each movable between an open position and a closed position.

6. The vehicle of claim 3, wherein the vehicle body further includes a receptacle disposed behind the battery receiving portion and the receptacle receives an operational lever of the locking mechanism.

7. The vehicle of claim 1, wherein the bottom of the battery receiving portion has a drainage port formed therethrough.

8. The vehicle of claim 2, wherein the battery receiving portion is provided with a locking mechanism for preventing the on-board battery received in the battery receiving portion from coming out of the battery receiving portion.

* * * * *